US012095151B2

(12) United States Patent
Butscher et al.

(10) Patent No.: US 12,095,151 B2
(45) Date of Patent: Sep. 17, 2024

(54) VEHICLE COMPRISING AN ANTENNA APPARATUS, AND ANTENNA APPARATUS AND FASTENING DEVICE

(71) Applicant: Continental Automotive GmbH, Hannover (DE)

(72) Inventors: Florian Butscher, Aschau im Chiemgau (DE); Johann Frisch, Ruhpolding (DE)

(73) Assignee: Continental Automotive GmbH, Hannover (DE)

( * ) Notice: Subject to any disclaimer, the term of this patent is extended or adjusted under 35 U.S.C. 154(b) by 195 days.

(21) Appl. No.: 17/767,352

(22) PCT Filed: Sep. 21, 2020

(86) PCT No.: PCT/EP2020/076217
§ 371 (c)(1),
(2) Date: Apr. 7, 2022

(87) PCT Pub. No.: WO2021/069193
PCT Pub. Date: Apr. 15, 2021

(65) Prior Publication Data

US 2022/0393342 A1 Dec. 8, 2022

(30) Foreign Application Priority Data

Oct. 10, 2019 (DE) ..................... 10 2019 215 533.2

(51) Int. Cl.
*H01Q 1/32* (2006.01)
*H01Q 1/12* (2006.01)

(52) U.S. Cl.
CPC ......... *H01Q 1/3275* (2013.01); *H01Q 1/1214* (2013.01)

(58) Field of Classification Search
CPC ...... H01Q 1/3275; H01Q 1/1214; H01Q 1/12; H01Q 1/20; B60R 11/00; B60R 2011/004; B60R 2011/005
See application file for complete search history.

(56) References Cited

U.S. PATENT DOCUMENTS 10,377,321 B2 * 8/2019 Yerdon ................ G03B 17/561
2004/0084920 A1 * 5/2004 Trimble .................. B60R 11/02
296/37.8

(Continued)

FOREIGN PATENT DOCUMENTS

DE 10330962 A1 1/2005
DE 102014018428 B4 10/2018

(Continued)

OTHER PUBLICATIONS

Office Action dated Apr. 24, 2020 from corresponding German patent application No. 10 2019 215 533.2.

(Continued)

*Primary Examiner* — Hoang V Nguyen
*Assistant Examiner* — Yonchan J Kim

(57) ABSTRACT

Disclosed is a vehicle, comprising an antenna apparatus inserted at least in regions into an antenna opening of a vehicle roof of the vehicle. The antenna apparatus having at least one fastening device. The fastening device having a locking lever locking the antenna apparatus to the vehicle roof in a predetermined locking position of the locking lever and thereby fixing the antenna apparatus on the vehicle roof in a predetermined final assembly position. The fastening device having a spring device which acts on the locking lever with a restoring force acting in the direction of the predetermined locking position of the locking lever and holding the locking lever in the predetermined locking position. The spring device engaging around the vehicle roof in the predetermined final assembly position with a latching (Continued)

edge on an edge of the antenna opening and holding the antenna apparatus at least indirectly on the vehicle roof.

8 Claims, 4 Drawing Sheets

(56) References Cited

U.S. PATENT DOCUMENTS

| | | | | |
|---|---|---|---|---|
| 2010/0231467 | A1 | 9/2010 | Schnuerer | |
| 2016/0172746 | A1 * | 6/2016 | Butscher | H01P 3/16<br>29/428 |

FOREIGN PATENT DOCUMENTS

| | | | |
|---|---|---|---|
| DE | 102018102204 | A1 | 8/2019 |
| EP | 2228865 | A1 | 9/2010 |
| EP | 3174157 | A1 | 5/2017 |

OTHER PUBLICATIONS

International Search Report and Written Opinion dated Nov. 16, 2020 from corresponding International patent application No. PCT/EP2020/076217.

* cited by examiner

VEHICLE COMPRISING AN ANTENNA APPARATUS, AND ANTENNA APPARATUS AND FASTENING DEVICE

The invention relates to a vehicle comprising an antenna apparatus, and to an antenna apparatus and a fastening device for fastening an antenna apparatus to a vehicle.

According to the prior art, antennas for vehicles are arranged on antenna apparatuses on which electronic components for evaluating the received signals are also located. These antenna apparatuses can have printed circuit boards and are generally arranged at least in regions on a vehicle roof of the vehicle. So that these antenna apparatuses can be connected to the vehicle electronics, antenna apparatuses are often located in antenna openings of the vehicle roof. A part of the antenna apparatus is arranged inside the vehicle and connected to the vehicle wiring.

According to the current state of the art, there are two variants for fastening the antenna apparatuses in the antenna opening. The first variant provides for the antenna apparatus to be screwed into the antenna opening. This can ensure a secure hold, but assembly and nondestructive detachment of the antenna apparatus in the case of repairs are more complex.

The second variant provides for the antenna apparatus to be fastened in the antenna opening by latching the antenna apparatus in place by means of so-called latching devices. The advantage of these latching devices is that the antenna apparatus can be installed quickly and easily in the antenna opening. The antenna apparatuses can also be detached more easily in the event that repairs are required.

For example, DE 10 2014 018 428 B4 discloses an antenna module for mounting on an opening of a vehicle roof. The antenna module can be latched via at least one spring element.

When a force acts on the antenna apparatus, the described spring element can prevent the antenna apparatus from being released from the antenna opening of the roof up to a specific maximum force. In order to increase the maximum force, use of a more massive spring unit can be provided. However, a more massive spring unit restricts a tolerance in relation to sheet metal thicknesses of the roof panel and damage to the paintwork of the roof panel can occur when the antenna apparatus is arranged.

It is an object of the invention to increase the mechanical load-bearing capacity of an antenna apparatus held by a spring unit without reducing the tolerance with regard to roof panel thicknesses.

The object is achieved by the subject matter of the independent patent claims. Advantageous developments of the invention emerge from the features of the dependent patent claims, from the following description and from the figures.

The invention provides a vehicle that includes an antenna apparatus that is inserted at least in regions into an antenna opening of a vehicle roof of the vehicle. The antenna apparatus has at least one fastening device which has a locking lever which locks the antenna apparatus to the vehicle roof in a predetermined locking position of the locking lever and thereby fixes the antenna apparatus on the vehicle roof in an oriented manner in a predetermined final assembly position relative to the antenna opening. The fastening device also has a spring device which, due to its inherent tension, acts on the locking lever with a restoring force acting in the direction of the predetermined locking position of the locking lever and thereby holds the locking lever in the locking position. It is provided that the spring device engages around the vehicle roof in the predetermined final assembly position with a latching edge on an edge of the antenna opening and thereby holds the antenna apparatus at least indirectly on the vehicle roof.

In other words, a vehicle is provided whose antenna apparatus is fastened in the antenna opening in the final assembly position by means of the fastening device. The final assembly position can be a predetermined position of the antenna apparatus in the antenna opening. The at least one fastening device has the locking lever and the spring device. The locking lever is provided to lock the antenna apparatus in the predetermined final assembly position in the vehicle roof. The locking lever can be provided to prevent the antenna apparatus from being detached from the antenna opening. This can occur, for example, if the spring device cannot withstand a force exerted on the antenna apparatus. In this case, the antenna apparatus could not be held in the final assembly position solely by the spring device. In this case, the locking lever can touch down on the vehicle roof and prevent the antenna apparatus from being released from the antenna opening.

The spring device is designed both to exert the restoring force on the locking lever in order to bring it into the predetermined locking position and to hold the antenna apparatus in the antenna opening by engaging around the vehicle roof at an edge by means of the latching edge of the spring device.

The advantage of the invention is that the spring device enables the antenna apparatus to be latched in the antenna opening during an assembly process and at the same time a required mechanical stability is ensured via the locking lever.

The invention also includes developments that result in further advantages.

A development of the invention provides that the antenna apparatus has a locking element which bears against the locking lever and blocks the locking lever from being released from the predetermined locking position. In other words, the locking element is designed to prevent the fastening device from being released from the predetermined locking position by bearing against the locking lever in order to block a movement of the locking lever out of the locking position. This results in the advantage that unintentional unlocking of the fastening device can be prevented. It can be provided, for example, that the locking element bears against the locking lever and thus blocks a movement of the locking lever out of the locking position. The locking element can be formed, for example, as a wedge or pyramid or truncated pyramid.

A development of the invention provides that a pivot pin is arranged on the locking lever and on which the locking lever is rotatably mounted between an antenna chassis of the antenna apparatus and the locking element. In other words, provision is made for the locking lever to be fastened to the antenna chassis of the antenna apparatus by means of the pivot pin. It can be provided that the pivot pin is enclosed by the antenna chassis of the antenna apparatus and the locking element. This results in the advantage that the antenna apparatus can be prevented from being released from the predetermined final assembly position via the pivot pin arranged on an underside of an antenna chassis. Provision can be made, for example, for an underside of the antenna chassis to have a receptacle into which the pivot pin can be inserted. In order to enable the pivot pin to be enclosed, provision can be made for fastening the locking element in the antenna chassis of the antenna apparatus. The locking element can thus prevent the pivot pin from being released from a receptacle of the antenna chassis.

A development of the invention provides that the locking lever has a projection which locks the antenna apparatus in the predetermined locking position. In other words, the locking lever has a projection which, in the locking position, is arranged opposite a subregion of the roof panel. This restricts a movement of the antenna apparatus relative to the roof panel, as a result of which the antenna apparatus can be prevented from being released from the final assembly position. This results in the advantage that a movement of the antenna apparatus out of the final assembly position is blocked by the projection. Provision can be made, for example, for the locking lever to be able to absorb greater mechanical energy than the spring device. If forces act on the antenna apparatus, for example, which lead to the spring device yielding, it can no longer be ensured that the antenna apparatus will remain in the predetermined final assembly position solely by means of the spring device. In this case, the antenna apparatus can move in such a way that the projection touches down on the roof panel of the vehicle roof and the antenna apparatus is thus prevented from becoming released from the predetermined final assembly position.

A development of the invention provides that the spring device, when engaging around the vehicle roof, clamps the antenna apparatus and a roof panel of the vehicle roof between the latching edge of the spring device and a countersurface of the antenna apparatus and thus holds the antenna apparatus in the predetermined final assembly position relative to the antenna opening. In other words, the antenna apparatus is held in the predetermined final assembly position via the spring device by the spring device latching on the roof panel of the vehicle roof. For this purpose, the spring device has a latching edge which rests on the roof panel in a predetermined latching position and clamps the roof panel between the latching edge and the countersurface of the antenna apparatus. The development results in the advantage that it is possible to arrest the antenna apparatus on roof panels of different sheet metal thicknesses. It can be provided, for example, that a spring hardness of the spring device is selected in such a way that clamping of the roof panel is possible within certain tolerances of the panel thickness.

A development of the invention provides that a projection of the locking lever is arranged at a distance from the roof panel in the predetermined locking position. In other words, the projection of the locking lever does not touch the vehicle roof in the predetermined locking position. This results in the advantage that damage to the vehicle roof due to the locking lever, which is rigid in comparison with the spring device, can be avoided. Provision can be made, for example, for there to be a distance in the millimeter range between an edge of the projection and the vehicle roof when the locking lever is in the locking position. This can prevent the projection from damaging the paintwork of the vehicle roof. At the same time, it can be ensured that the projection touches down on the vehicle roof when the spring device yields. This can prevent the antenna apparatus from detaching from the antenna opening when the spring device yields.

A development of the invention provides that the spring device is designed as a wire spiral spring. In other words, the spring device is designed as a wire spring, with the wire spring forming a spiral which is wound around the pivot pin of the fastening element. This results in the advantage that the spring action on the locking lever is provided by means of a spiral on the pivot pin of the locking lever.

A development of the invention provides that the locking lever is designed as a sheet metal spring. In other words, the locking lever is a sheet metal spring. This results in the advantage that the locking lever provides a spring action, as a result of which tolerances in the thickness of the roof panel can be compensated for.

The invention also comprises the fastening device for fastening the antenna apparatus to the vehicle. The fastening device has a locking lever which is set up to lock the antenna apparatus to the vehicle roof in a predetermined locking position of the locking lever and thereby to fix the antenna apparatus on the vehicle roof in a predetermined final assembly position aligned relative to the antenna opening. The fastening device also has a spring device which is set up to act on the locking lever with a restoring force acting in the direction of the predetermined locking position of the locking lever through an inherent tension of the spring device and thereby to hold the locking lever in the locking position. Provision is made for the spring device to be set up to engage around the vehicle roof in the predetermined final assembly position with a latching edge on an edge of the antenna opening and thereby to hold the antenna apparatus at least indirectly on the vehicle roof.

The invention also comprises the antenna apparatus to be arranged on the vehicle. The antenna apparatus has a fastening device. The fastening device has a locking lever which is set up to lock the antenna apparatus to the vehicle roof in a predetermined locking position of the locking lever and thereby to fix the antenna apparatus on the vehicle roof in a predetermined final assembly position aligned relative to the antenna opening. The fastening device also has a spring device which is set up to act on the locking lever with a restoring force acting in the direction of the predetermined locking position of the locking lever through an inherent tension of the spring device and thereby to hold the locking lever in the locking position. Provision is made for the spring device to be set up to engage around the vehicle roof in the predetermined final assembly position with a latching edge on an edge of the antenna opening and thereby to hold the antenna apparatus at least indirectly on the vehicle roof.

The invention also includes developments of the antenna apparatus according to the invention and the fastening device according to the invention, which have features as have already been described in connection with the developments of the vehicle according to the invention. For this reason, the corresponding developments of the antenna apparatus according to the invention and the fastening device according to the invention are not described again here.

The invention also comprises the combinations of the features of the described embodiments.

An exemplary embodiment of the invention is described below. In this respect:

The exemplary embodiment explained below is a preferred embodiment of the invention. In the exemplary embodiment, the described components of the embodiment each represent individual features of the invention that should be considered independently of one another and that each also develop the invention independently of one another and can therefore also be considered to be part of the invention individually or in a combination other than that shown. Furthermore, the embodiment described can also be supplemented by further features of the invention that have already been described.

In the figures, elements with the same function are each provided with the same reference signs.

Figure 1:
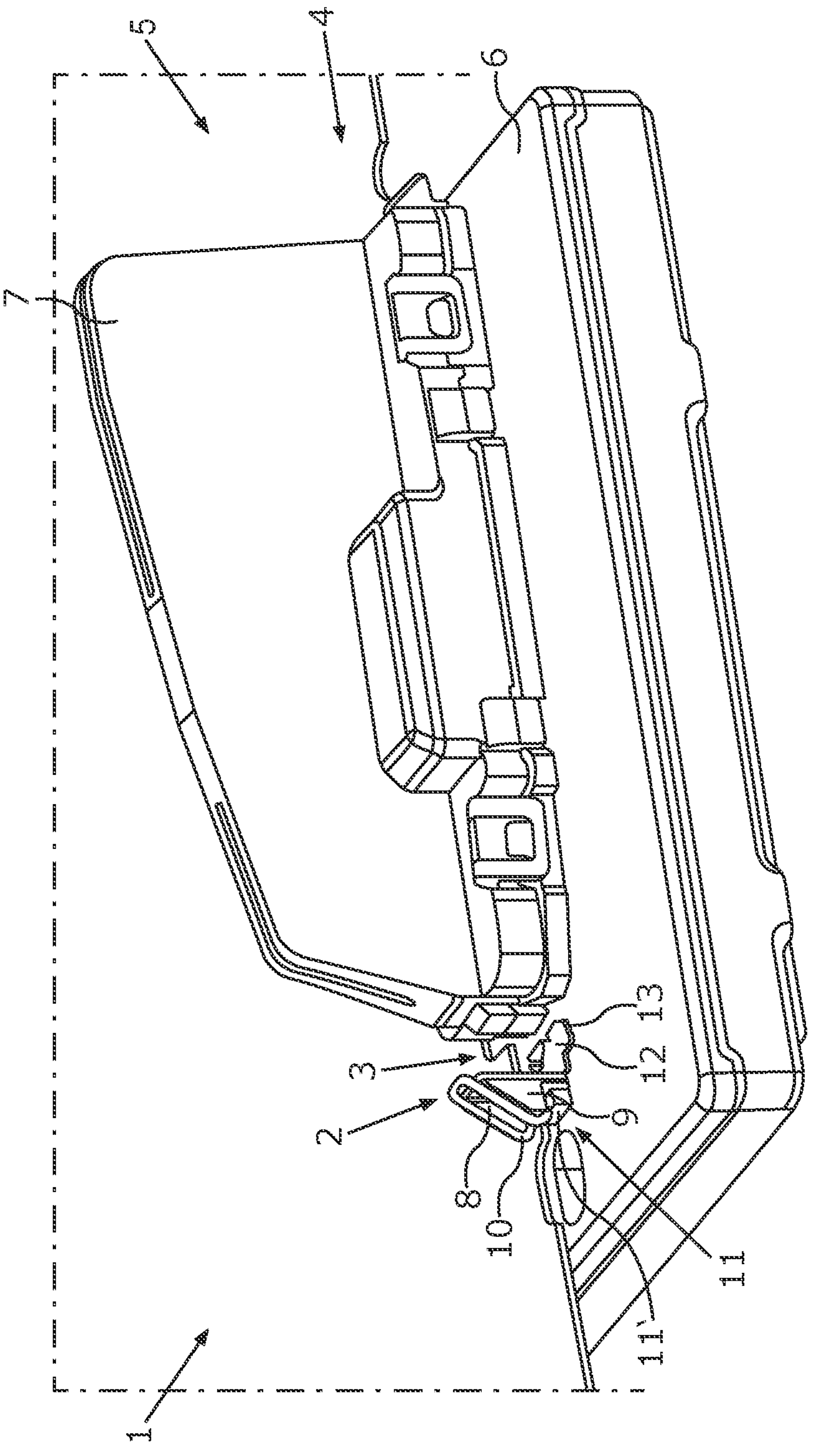
FIG. 1 shows an antenna apparatus.

FIG. 1 shows a vehicle 1 with an antenna apparatus 2. The antenna apparatus 2 can be inserted into an antenna opening 3 which can be located in a roof panel 4 of a vehicle roof 5 of the vehicle 1. The antenna apparatus 2 can have an antenna chassis 6 and a cover 7, the antenna chassis 6 being able to bear against an underside of the vehicle roof 5. The cover 7 of the antenna apparatus 2 can at least partially protrude from the antenna opening 3 of the vehicle roof 5. In order to be able to fasten the antenna apparatus 2 to the vehicle roof 5 of the vehicle 1, the antenna apparatus 2 can have a fastening device 8. The fastening device 8 can have a locking lever 9 and a spring device 10. The locking lever 9 can be set up to fix the antenna apparatus 2 on the vehicle roof 5 in a predetermined final assembly position relative to the antenna opening 3. In order to bring the locking lever 9 into a predetermined locking position, the spring device 10 can be set up to act on the locking lever 9 with a restoring force acting in the direction of the predetermined locking position of the locking lever 9 and thereby to hold the locking lever 9 in the locking position. The spring device 10 can be braced with the vehicle roof 5 in the predetermined final assembly position. The bracing can take place in such a way that a region of the roof panel 4 is pressed against an opposite side 11 of the antenna chassis 6 by the spring device 10. A support block 11' may be provided here. In order to be able to fix the fastening device 8 in the final assembly position of the antenna apparatus 2, a locking element 12 can be inserted in a guide channel 13 of the antenna chassis 6. The locking element 12 can thereby prevent a movement of the locking lever 9 from the predetermined locking position.

Figure 2:
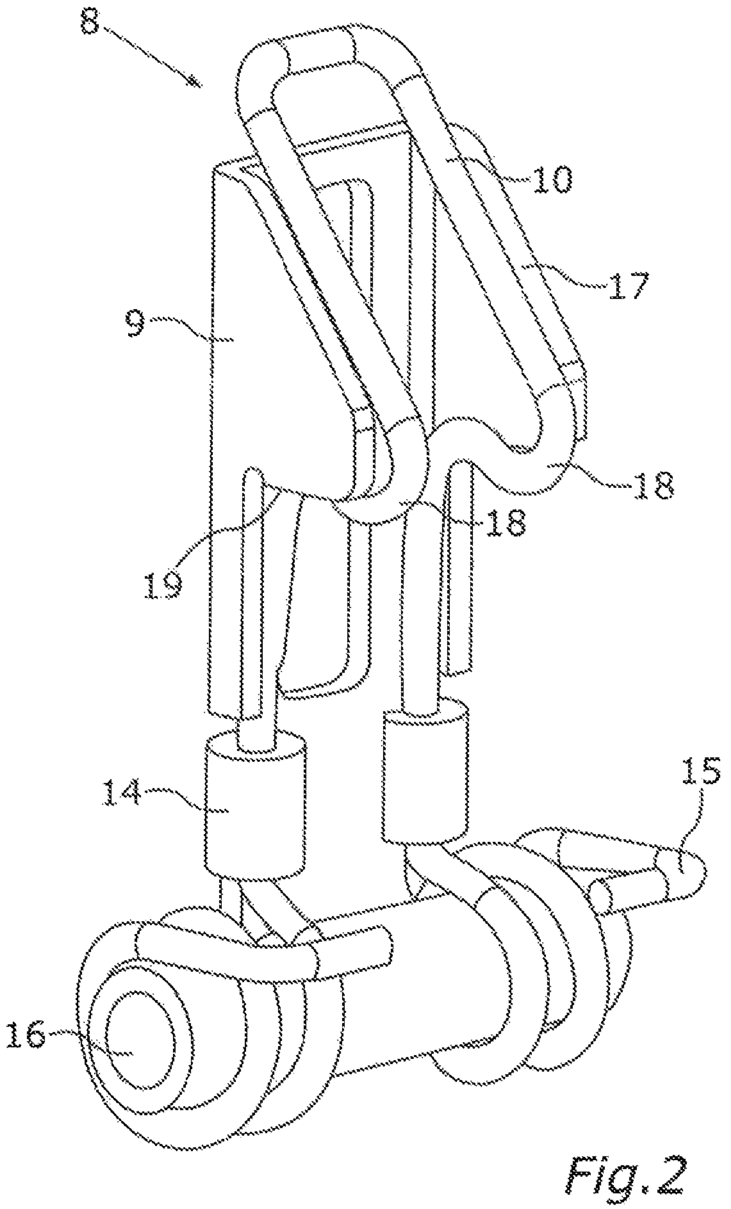
FIG. 2 shows a fastening device.
Figure 3:
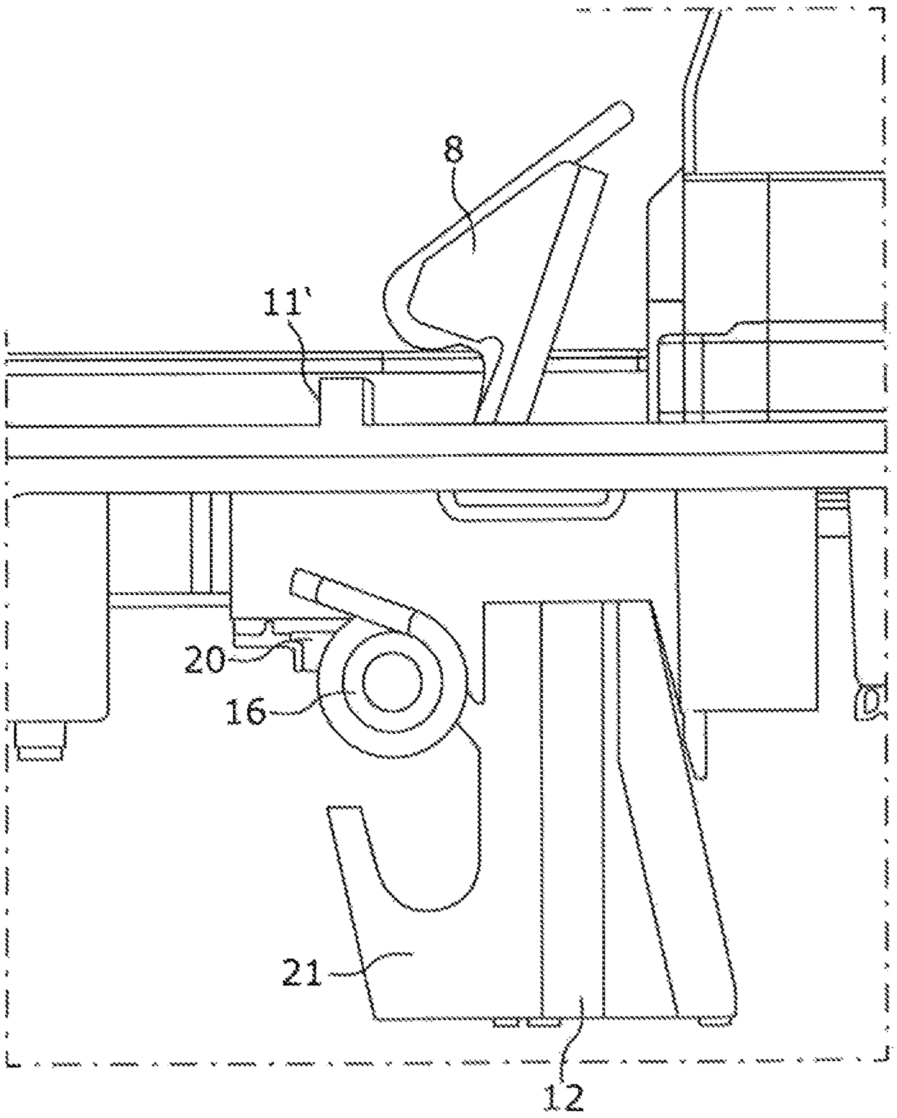
FIG. 3 shows a further view of the fastening device.

FIG. 2 shows the fastening device 8. The fastening device 8 can have the spring device 10 and the locking lever 9. The spring device 10 and the locking lever 9 can be caulked into one another via a connection 14. In order to provide the restoring force, it can be provided that the spring device 10 is designed as a wire spiral spring, with the spring ends of the spring device 10 being designed as restoring ends 15 which can be arranged on the antenna chassis 6 of the antenna apparatus 2. A pivot pin 16 can be formed on the locking lever 9 and can be inserted into a receptacle 20 of the antenna chassis 6 as shown in FIG. 3. A spiral of the spring device 10 can be arranged around the pivot pin 16 and can be set up to bring about the restoring force. The spring device 10 and the locking lever 9 can have sliding surfaces 17 which can enable the fastening device 8 to be threaded into the vehicle roof 5. The spring device 10 can provide latching edges 18 which can rest on the roof panel 4 of the vehicle roof 5 in the predetermined final assembly position. As a result, the antenna apparatus 2 can be clamped on the vehicle roof 5. In the final assembly position, the locking lever 9 can rest on the vehicle roof 5 by means of its projection 19.

FIG. 3 shows the fastening device 8 and the locking element 12 while the antenna apparatus 2 is being threaded into the antenna opening 3. Owing to the oblique sliding surfaces 17 of the fastening device 8, a force can be exerted when the antenna apparatus 2 is moved through the antenna opening 3, as a result of which the locking lever 9 can be moved out of the locking position. In this case, the pivot pin 16 can lie in a receptacle 20 of the antenna chassis 6. The locking element 12 can be arranged in a free position during threading in and not yet be arrested in the guide channel 13 of the antenna chassis 6. The locking element 12 can provide an opposite side 21 which can rotatably support the pivot pin 16 together with the receptacle 20 of the antenna chassis 6.

Figure 4:
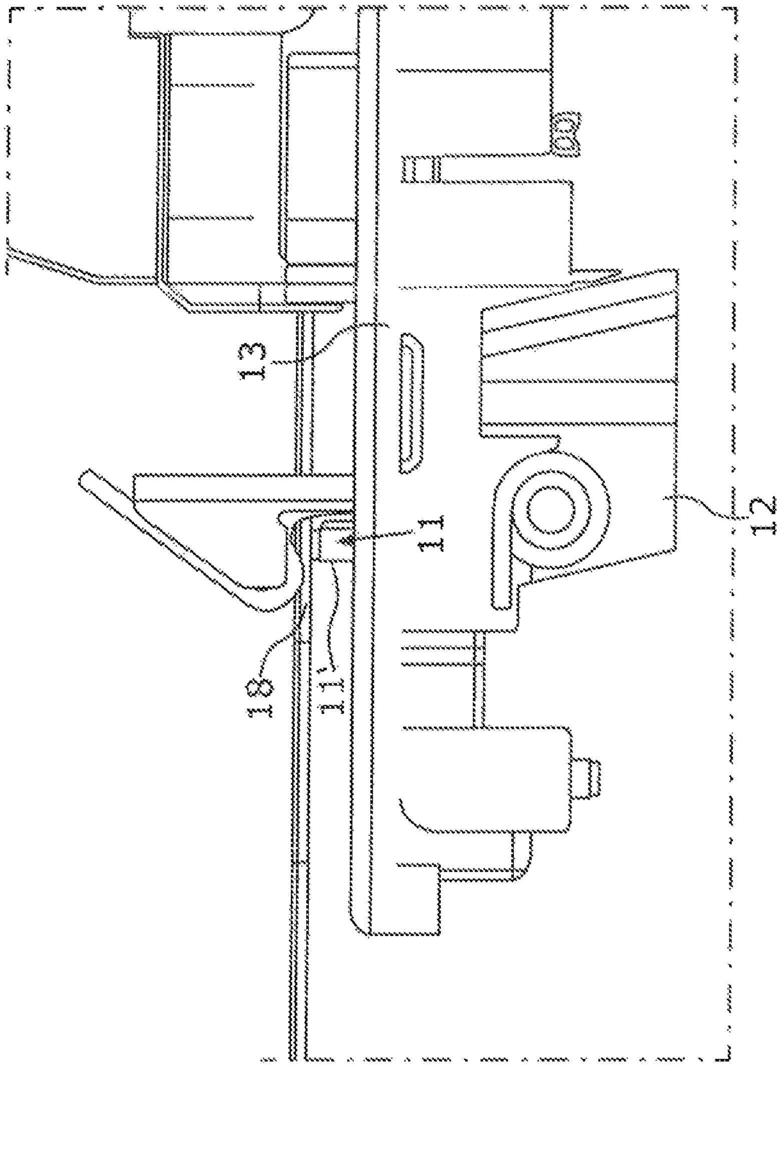
FIG. 4 shows a further view of the fastening device.

FIG. 4 shows the fastening device 8 in the final assembly position of the antenna apparatus 2. In the final assembly position, the roof panel 4 of the vehicle roof 5 can be pressed against an opposite side 11 of the antenna apparatus 2 by the spring device 10. The roof panel 4 can here be located between the latching edge 18 and the opposite side 11. In the final assembly position, the locking lever 9 can be oriented in the locking position. The restoring end 15 of the spring device 10 can bear against an underside of the antenna chassis 6 and thereby provide the spring force which can hold the locking lever 9 in the predetermined locking position. In order to be able to fix the fastening device 8 in the predetermined locking position, the locking element 12 can be arranged in the guide channel 13 and thus prevent the locking lever 9 from being released from the predetermined locking position.

The invention consists in a combination of the locking lever 9 and the spring device 10 to form the fastening device 8 (spring system) by caulking the locking lever 9 with the spring device 10. The spring device 10 can be configured as a wire spiral spring, and the locking lever 9 can be configured as a sheet metal spring. The wire spiral spring enables the antenna apparatus 2 to be easily threaded into the antenna opening 3. Because of its round shape, paint on the roof panel 4 is not damaged. The spring device 10 allows the antenna apparatus 2 to be able to be pre-latched in the antenna opening 3 of the vehicle roof 5 until the locking element 12 (locking device) can be pressed in. The locking lever 9, which can be configured as a rigid sheet metal spring, is supported on the roof panel 4 in the event of a shock/crash and thus directs the forces of the impulse into the vehicle roof 5. The invention allows the antenna apparatus 2 to be mounted with one hand in the antenna opening 3 of the vehicle roof 5 with a tolerance compensation of the sheet metal thicknesses of the roof panel 4 of 0.7 to 1.2 mm. This makes it possible to withstand a mechanical shock (crash situation) of 150 g without losing the connection between the antenna apparatus 2 and the vehicle roof 5. A further use may be possible in trucks, trains and commercial vehicles, where highly integrated and stacked printed circuit boards can be used. One-hand assembly of the antenna apparatus 2 in the antenna opening 3 from inside the vehicle is made possible by the spring device 10. The spring device 10 can allow pre-latching of the antenna apparatus 2 to occur until a worker has pressed the locking element 12 (locking device) into the guide channel 13. The fastening device 8 enables tolerance compensation for different sheet metal thicknesses of the vehicle roof from 0.7 to 1.2 mm. In the event of a crash, the locking lever 9 can absorb a shock of 150 g without the antenna apparatus 2 being released from the antenna opening 3.

Overall, the example shows how two-part mounting spring locking can be provided by the invention.

LIST OF REFERENCE SIGNS

1 vehicle
2 antenna apparatus
3 antenna opening
4 roof panel
5 vehicle roof
6 antenna chassis
7 cover
8 fastening device

9 locking lever
10 spring device
11 opposite side
11' support block
12 locking element
13 guide channel
14 connection
15 restoring ends
16 pivot pin
17 sliding surfaces
18 latching edge
19 projection
20 receptacle
21 opposite side

The invention claimed is:

1. A vehicle, comprising an antenna apparatus inserted at least in regions into an antenna opening of a vehicle roof of the vehicle, wherein:

the antenna apparatus has at least one fastening device with a locking lever which locks the antenna apparatus to the vehicle roof in a predetermined locking position of the locking lever and thereby fixes the antenna apparatus on the vehicle roof in a predetermined final assembly position aligned relative to the antenna opening, a spring device, different from the locking lever, which, due to an inherent tension of the spring device, acts on the locking lever with a restoring force acting in a direction of the predetermined locking position of the locking lever and thereby holds the locking lever in the predetermined locking position, wherein the spring device engages around the vehicle roof in the predetermined final assembly position with a latching edge on an edge of the antenna opening and thereby holds the antenna apparatus at least indirectly on the vehicle roof, wherein the spring device is configured as a wire spiral spring, and wherein the locking lever is configured as a rigid sheet metal spring.

2. The vehicle as claimed in claim 1, wherein:

the antenna apparatus has a locking element which bears against the locking lever and blocks the locking lever from being released from the predetermined locking position.

3. The vehicle as claimed in claim 1, wherein:

a pivot pin is arranged on the locking lever and on which the locking lever is rotatably mounted between an antenna chassis of the antenna apparatus and a locking element.

4. The vehicle as claimed in claim 1, wherein:

the locking lever has a projection which locks the antenna apparatus in the predetermined locking position.

5. The vehicle as claimed in claim 1, wherein:

the spring device, when engaging around the vehicle roof, clamps the antenna apparatus and a roof panel of the vehicle roof between a latching edge of the spring device and a countersurface of the antenna apparatus and thus holds the antenna apparatus in the predetermined final assembly position relative to the antenna opening.

6. The vehicle as claimed in claim 1, wherein:

in a locking position, a projection of the locking lever is arranged at a distance from a roof panel in the predetermined locking position of the locking lever.

7. A fastening device for holding an antenna apparatus in an antenna opening of a vehicle roof of a vehicle, wherein the fastening device has:

a locking lever which is set up to lock the antenna apparatus to the vehicle roof in a predetermined locking position of the locking lever and thereby to fix the antenna apparatus on the vehicle roof in a predetermined final assembly position aligned relative to the antenna opening, and a spring device, different from the locking lever, which is set up to act on the locking lever with a restoring force acting in a direction of the predetermined locking position of the locking lever through an inherent tension of the spring device and thereby to hold the locking lever in the predetermined locking position, wherein the spring device is set up to engage around the vehicle roof in the predetermined final assembly position with a latching edge on an edge of the antenna opening and thereby to hold the antenna apparatus at least indirectly on the vehicle roof, wherein the spring device is configured as a wire spiral spring, and wherein the locking lever is configured as a rigid sheet metal spring.

8. An antenna apparatus for at least regional insertion into an antenna opening of a vehicle roof of a vehicle, wherein at least one fastening device is provided which has:

a locking lever which is set up to lock the antenna apparatus to the vehicle roof in a predetermined locking position of the locking lever and thereby to fix the antenna apparatus on the vehicle roof in a predetermined final assembly position aligned relative to the antenna opening, and a spring device, different from the locking lever, which is set up to act on the locking lever with a restoring force acting in a direction of the predetermined locking position of the locking lever through an inherent tension of the spring device and thereby to hold the locking lever in the predetermined locking position, wherein the spring device is set up to engage around the vehicle roof in the predetermined final assembly position with a latching edge on an edge of the antenna opening and thereby to hold the antenna apparatus at least indirectly on the vehicle roof, wherein the spring device is configured as a wire spiral spring, and wherein the locking lever is configured as a rigid sheet metal spring.

* * * * *